United States Patent
Kim et al.

(10) Patent No.: US 6,620,750 B2
(45) Date of Patent: Sep. 16, 2003

(54) DIELECTRIC CERAMIC COMPOSITION AND METHOD FOR MANUFACTURING MULTILAYERED COMPONENTS USING THE SAME

(75) Inventors: Dong-Wan Kim, Seoul (KR); Do-Kyun Kwon, Seuol (KR); Jong-Sung Park, Seoul (KR); Jin-Young Kim, Seoul (KR)

(73) Assignee: Kook-Sun Hong, Seoul (KR)

( * ) Notice: Subject to any disclaimer, the term of this patent is extended or adjusted under 35 U.S.C. 154(b) by 167 days.

(21) Appl. No.: 09/945,717

(22) Filed: Sep. 5, 2001

(65) Prior Publication Data

US 2003/0004051 A1 Jan. 2, 2003

(30) Foreign Application Priority Data

May 18, 2001 (KR) .......................... 2001-27158

(51) Int. Cl.$^7$ ............................. C04B 35/495
(52) U.S. Cl. ................. 501/134; 501/135; 264/615; 264/618; 361/321.4
(58) Field of Search ................ 501/134, 135; 264/615, 618; 361/321.4

(56) References Cited

U.S. PATENT DOCUMENTS

| | | | |
|---|---|---|---|
| 3,268,349 A | * | 8/1966 | Brixner ...................... 501/102 |
| 4,987,107 A | | 1/1991 | Narumi et al. |
| 5,264,402 A | | 11/1993 | Sano et al. |
| 6,316,376 B1 | | 11/2001 | Hong et al. |
| 6,528,445 B1 | * | 3/2003 | Hong et al. ................. 501/137 |

* cited by examiner

*Primary Examiner*—David Brunsman
(74) *Attorney, Agent, or Firm*—Shanks & Herbert

(57) ABSTRACT

The present invention discloses dielectric ceramic compositions having dielectric properties suitable for high frequency bands, such as microwave and millimetric wave, and a method for manufacturing multilayered components, such as chip LC filters, chip duplexers, and dielectric filters for PCS, using the dielectric ceramic compositions. The dielectric ceramic composition not only possesses low dielectric loss, a high dielectric constant, and temperature stability, but are also capable of being sintered at low temperatures and simultaneously baked with metal electrodes, including silver, copper, silver/palladium. Therefore, the dielectric composition can be applied to temperature stable capacitors (NPO MLCC), microwave oscillators, substrates, filters, planar antenna and on the like. The dielectric composition are represented by the general formula:

$$A'_x A''_{1-x} B'_y B''_{1-y} O_4$$

where A' and A" are La, Nd, Y and Al; B' and B" are Nb and Ta.

17 Claims, No Drawings

DIELECTRIC CERAMIC COMPOSITION AND METHOD FOR MANUFACTURING MULTILAYERED COMPONENTS USING THE SAME

BACKGROUND OF THE INVENTION

1. Field of the Invention

The present invention relates to a dielectric ceramic composition and a method for manufacturing multilayered components using the same. More specifically, the present invention is directed to a dielectric ceramic composition having dielectric properties suitable for high frequency regions such as microwave and millimetric wave, a low dielectric loss, a large dielectric constant and temperature stability, in which the dielectric composition can be sintered at low temperature and thus simultaneously baked with metal electrodes, such as silver, copper, silver/palladium, so being applicable to electronic parts, including resonators, multilayered ceramic capacitors, filters, dielectric substrate materials for monolithic IC (MIC), and dielectric waveguide materials and the like, and a method for manufacturing multilayered components using the dielectric ceramic composition.

2. Description of the Prior Art

Along with great advances in electronic and communication technologies, the hardware for embodying them has also been miniaturized. This miniaturization is due in part to new stacking and chipping techniques. Recently, because of the development of communication means using microwave bands, such as mobile phones and satellite broadcasting, there is continuing pressure and demand in the market place for further miniaturization of dielectrics components.

An example of the components to which stacking techniques are applied is a capacitor. Examples of stacked type components for use in mobile communication terminals include filters, couplers, duplexers, oscillators and multichip modules (MCM).

The stacked type components are generally composed of multilayered dielectrics and inner electrodes which are fabricated by laminating a dielectric into a thin tape, printing an inner electrode onto the dielectric laminate, stacking many laminates and firing the stack.

Suitable materials for the composition of inner electrodes include silver, copper, nickel, palladium, platinum, gold and alloys thereof. The selection of inner electrode materials is determined based on sintering temperature and the properties of the ceramic dielectrics which are sintered therewith.

In this regard, a silver (Ag) electrode, exhibiting the lowest specific resistance ($1.62 \times 10^{-4}$ Ωm) and being inexpensive, cannot be applied to ceramic dielectrics which must be sintered at 950° C. or higher, because of silver's low melting point (mp.) of 961° C. Meanwhile, gold (Au), platinum (Pt) or palladium (Pd) have low melting points, but are disadvantageous in terms of their high cost, so that the use of these materials is restricted. As for copper (Cu) or nickel (Ni) electrodes, their very poor oxidation resistance requires sintering at an oxygen partial pressure as low as about $10^{-9}$ atm. The low pressure associated with thermally treating Nickel or copper electrodes under low oxygen, partial pressure causes most dielectric ceramic compositions to show highly increased dielectric loss, and therefore cannot be used as capacitors.

To be useful for stacked type components, dielectrics must be capable of being sintered along with electrodes in addition to having dielectric properties suitable for application. Such dielectric requirements include: 1) A high dielectric constant ($\in_r$); 2) A quality factor (Qxf); and 3) A low dependency of resonance frequency modulation ($\tau_f$) as a function of temperature change. Typically, these dielectric compositions are composed of $BaO-TiO_2$, $BaO-ReO-TiO_2$ (ReO is oxide of rare-earth elements), $MgTiO_3-CaTiO_3$. $BaO-TiO_2$ has a high dielectric constant of 37–40, and a large quality factor (Qxf) of 30,000. However, in single-phase, $BaO-TiO_2$ is not capable of achieving a temperature coefficient corresponding to a resonant frequency of zero. Further problems include the fact that the dielectric constant is changed according to the composition, and further, there is a high temperature dependency of the dielectric constant modulation. Because of these inherent properties, the temperature coefficient of resonant frequency of low values cannot be stably maintained, while keeping a high dielectric constant and low dielectric loss.

On the other hand, $BaO-ReO-TiO_2$ types, including $BaO-Nd_2O_3-TiO_2$ or $BaO-Sm_2O_3-TiO_2$, have a high dielectric constant of 50–80, and stable temperature coefficients of resonant frequency, but are disadvantageous based on low Qxf values of 5,000 or lower. In $MgTiO_3-CaTiO_3$, the value of Qxf is 30,000 or higher, the temperature coefficient of resonant frequency is approximately zero, the dielectric constant is within the range of 16–25.

Ceramic dielectric compositions in current use in stacked type components are, for the most part, composed primarily of $BaTiO_3$, by itself or in composition with oxide-sintering aids, such as $Bi_2O_3$, or glass frits, for decreasing sintering temperatures. Typically, the sintering of temperatures these conventional dielectric compositions range from about 1,100 to about 1,300° C. Further, these dielectric compositions are resistant to reduction and possess dielectric constants with values of several hundred or higher. Their great dielectric loss, however makes it difficult to apply them in designs where a frequency band of 1 MHz or higher is used. Additionally, the dielectric compositions suffer from the drawback of undergoing a dielectric constant fluctuation of as large as several hundred ppm/° C., which renders them unusable as temperature-stable capacitors or components for mobile communication devices.

Dielectric compositions known to be usable for stacked type components, operable with frequencies of 1 MHz or higher, are exemplified by CuO or $V_2O_5$-added $Bi_2O_3-CaO-Nb_2O_5$ and glass-added (Mg, Ca)$TiO_3$, (Zr, Sn)$TiO_4$ or (CaO-$ZrO_2$). CuO or $V_2O_5$ added $Bi_2O_3-CaO-Nb_2O_5$ compositions may be sintered at 900° C., possess a dielectric constant of 40 or higher, and a quality factor of 18,000 or higher. In addition, Japanese Laid-Open Patent Application No. Hei. 11-34231 and U.S. Pat. No. 5,350,639 relate to the manufacture of chip type stacked capacitors making use of low melting point electrodes including Ag and Cu, and dielectric resonators using strip lines.

Japanese Laid-Open Patent Application No. Hei. 9-315859 discloses that CaO-$ZrO_2$ is added with alkaline earth-metal compounds including boron (B), lithium (Li) and sodium (Na), and thus can be sintered at low temperatures in the range of about 900° to about 1,200° C. These compositions, however, cannot be effectively sintered at a temperature of 1,000° C. or lower, possess poor dielectric properties at microwave frequencies, and exhibit excess reactivity with electrode materials.

SUMMARY OF THE INVENTION

It is, accordingly, an abject of the present invention to provide a dielectric ceramic composition, which possesses excellent temperature stability, low temperature sintering properties, and a high dielectric quality factor at low dielectric bands.

Another object of the present invention is to provide a method for manufacturing multilayered components using the dielectric composition.

In one aspect of the present invention, there is provided a dielectric ceramic composition comprising (A) at least one oxide selected from the group consisting of $La_2O_3$, $Nd_2O_3$, $Al_2O_3$ and $Y_2O_3$, and (B) at least one oxide selected from the group consisting of $Nb_2O_5$, $Ta_2O_5$, at a molar ratio of 1:1, and being represented by the general formula:

$$A'_x A''_{1-x} B'_y B''_{1-y} O_4$$

(wherein, A' and A" represent elements selected from the group consisting of La, Nd, Y and Al; B' and B" represent elements selected from the group consisting of Nb and Ta; and x and y represent mole fractions, each in the range of $0 \leq x \leq 1.0$ and $0 \leq y \leq 1.0$, respectively).

As such, the dielectric ceramic composition may further comprise at least one sintering aid selected from the group consisting of $B_2O_3$, CuO, ZnO and $Bi_2O_3$, and at least one additive selected from the group consisting of $V_2O_5$, $SnO_2$, MgO, NiO, $Sb_2O_3$, LiF and $Ag_2O$.

In another aspect of the present invention, there is provided a method for manufacturing multilayered components using the dielectric ceramic composition, comprising the following steps of: mixing a main component represented by the formula $A'_x A''_{1-x} B'_y B''_{1-y} O_4$ (wherein A' and A" are selected from the group consisting of La, Nd, Y and Al; B' and B" are selected from the group consisting of Nb and Ta; and x and y are mole fractions, each in the range of $0 \leq x \leq 1.0$ and $0 \leq y \leq 1.0$, respectively) with a sintering aid, an additive, or mixtures thereof, to form a slurry,; deaerating the slurry, molding the deaerating slurry into a tape form; printing an inner electrode on the molded tape by use of a low melting point electrode paste characterized by a melting point of about 1000° C. or lower; laminating the inner electrode-printed tape to at least two layers; and sintering the laminated tape in a sintering furnace at about 1000° C. or lower.

DETAILED DESCRIPTION OF THE INVENTION

A $LaNbO_4$ composition, based on the formula $A'_x A''_{1-x} B'_y B''_{1-y} O_4$ composition of the present invention, is not reported for low temperature sintering and dielectric properties at microwave bands, except for monoclinic-to-tetragonal phase transformation (Jian et al., J. Am. Ceram. Soc., 80(3) 803–806 (1997)).

To improve the dielectric properties of the $LaNbO_4$ composition, a cationic substituent selected from the group consisting of $Nd_2O_3$, $Al_2O_3$, $Y_2O_3$, $Bi_2O_3$, $Sb_2O_3$, $Ta_2O_5$ and mixtures thereof may be added to the composition. As a result of adding a cationic substituent to the $LaNbO_4$-based composition, the dielectric constant and temperature coefficient of resonant frequency of the composition become substantially improved. The cationic substituents, $Nd_2O_3$, $Al_2O_3$, $Y_2O_3$, $Bi_2O_3$ and $Sb_2O_3$ function by substituting Nd, Al, Y, Bi and Sb for La of the main composition. As such, a preferable amount of a substituent corresponding to $Nd_2O_3$, $Al_2O_3$, $Y_2O_3$, $Bi_2O_3$ and $Sb_2O_3$ falls within the range of from about 0.01 to about 50 mole %. If the substituent amount is outside said range, the dielectric loss and temperature coefficient are increased. On the other hand, $Ta_2O_5$ is used to substitute Ta for Nb of the $LaNbO_4$-based composition. Furthermore, the substituent $Ta_2O_5$ is favorably added in the amount ranging from about 0.01 to about 50 mole %. The substituent amount beyond said range results in poor sintering properties.

The $A'_x A''_{1-x} B'_y B''_{1-y} O_4$ based compositions, such as the $LaNbO_4$-based and cation-substituted compositions, are added to a mixture with at least one oxide, as a sintering aid selected from the group consisting of $B_2O_3$, CuO, ZnO and $Bi_2O_3$, and subsequently mixed. The solvent-removed mixture is calcined, ground, mixed in the presence of a binder, molded, and sintered, to yield a dielectric composition. The sintering aid is preferably added in an amount ranging from about 0.01 to about 7 parts by weight of the main composition. If the added amount of the sintering aid meets said range, sintering of the composition is enhanced, and the dielectric properties of the composition are simultaneously improved. However, when the amount of the sintering aid is beyond said range, no improvements can be expected in either the sintering or the dielectric properties of the composition.

It is necessary to add at least one additive selected from the group consisting of $V_2O_5$, $SnO_2$, MgO, NiO, $Sb_2O_3$, LiF and $Ag_2O$, together with the sintering aid. The additive is preferably used in an amount ranging from about 0.01 to about 7 parts by weight on the basis of 100 parts by weight of the main composition. Within this range, the additive acts to improve the sintering properties of the main composition.

In the present invention, the sintering aid is added to lower the sintering temperature of the $A'_x A''_{1-x} B'_y B''_{1-y} O_4$-based composition to a temperature ranging from about 850–1,000° C. The method for preparing the dielectric composition of the present invention can be used in the fabrication of practical lamination parts, such as chip LC filters, chip duplexers, and dielectric filters for personal communication service (PCS). As explained great detail below, the method of preparing multilayered components, such as dielectric filters for PCS, is accomplished by adding at least one cationic substituent to a $LaNbO_4$-based composition and selectively adding the sintering aid or the additive to the mixture.

The starting material corresponding to the present dielectric composition is weighed, and added with polyvinyl butyral and a plasticizer. The mixture is then introduced into an organic solvent and mixed for 24 hours in order to prepare a slurry for tape casting.

The slurry is subsequently deaerated and molded using a tape caster into a thin dielectric tape with a thickness ranging from about 10 to about 150 μm. An inner electrode is then printed on the molded tape using a low melting point electrode paste with a melting point of about 1,000° C. or lower melting point.

Subsequently, the inner electrode-printed tape is laminated in at least two layers, and then the laminated tape is sintered in a sintering furnace at a temperature of about 1,000° C. or lower.

Alternatively, dielectric powders may be used to prepare a paste, which is then repeatedly printed resulting in the manufacturing of multilayered components.

The dielectric composition of the present invention can be sintered at about 900° C., thus being capable of simultaneous sintering with low melting point electrodes, such as pure silver (Ag). Additionally, the composition has the temperature coefficient of resonant frequency of about ±10 ppm/° C. or lower, and can be applied to temperature stability-requiring parts, for instance, temperature-stable lamination capacitors (NPO MLCC). In addition, the dielectric composition is characterized by a superior quality factor (Qxf) of 40,000 or more at frequency bands of 8–11 GHz. Therefore, the dielectric composition can be used for mobile communication parts including microwave filters, oscillators, planar antenna, MCM and the like. The dielectric properties of said dielectric composition are hardly changed at the sintering temperature range of about 900 to about 950° C., whereby the composition with a temperature coefficient of resonant frequency ($\tau_f$) of ±10 ppm/° C. or lower can be stably used in products manufacturing.

The present invention is further illustrated by the following examples, which are not to be construed in any way as imposing limitations upon the invention's scope. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES 1–21

In these examples, various $LaNbO_4$-based dielectric compositions for high frequency bands were prepared to evaluate the effects of cation substituents on dielectric properties and sintering properties of the $LaNbO_4$-based composition. A process of preparing dielectric compositions and an analysis of dielectric and sintering properties of the prepared dielectric composition for high frequency bands are as follows.

The starting materials including $La_2O_3$, $Nd_2O_3$, $Al_2O_3$, $Y_2O_3$, $Bi_2O_3$, $Sb_2O_3$, $Nb_2O_5$ and $Ta_2O_5$ (99.9% approximately purity) were weighed to give the compositions of ($La_2O_3$, $Nd_2O_3$, $Al_2O_3$, $Y_2O_3$, $Bi_2O_3$, $Sb_2O_3$, $Nb_2O_5$):($Nb_2O_5$, $Ta_2O_5$) a weight ratio of 1:1, as shown in Table 1. The weighed materials were then introduced into a polyethylene vessel in the presence of ethanol, at a weight ratio of 1:1. For smooth mixing, a dispersing agent (Cerasperse 5468CF, supplied from Sannopco, Japan) was added at an amount of 1 part by weight. The prepared samples were mixed for 24 hours in a ball mill using an yttria stabilized zirconia.

The resulting mixed slurry was heated in an oven at 100° C. to remove the solvent, followed by calcination at a temperature ranging from about 1100° C. to about 1,300° C. for 2 hours in an alumina crucible. The calcined powders were milled for 24 hours in the same manner as in the above mixing process.

Polyvinyl alcohol (PVA) was subsequently added as a binder at an amount of 1 part by weight to the milled slurry, which was then coarsely granulized. Under a pressure of 1000 kg/cm², the granules were molded into a cylindrical form having a 10 mm diameter and a 4–5 mm height. The cylinders were sintered at a temperature ranging from about 1,200° C. to about 1400° C. in an air atmosphere with the temperature being elevated at a rate of 5° C./min. After sintering, the cylinders were cooled within the furnace.

The-sintered samples were then examined for their dielectric properties. The dielectric properties at frequency bands of GHz were measured by a HP8720C network analyzer supplied from the Hewlett-Packard Co. (Palo Alto, Calif.), using a transmission cavity method [See "Waveguide Type Dielectric Resonators-Part 1-2: General Information and Test Conditions," IEC (International Electrotechnical Commission): IEC61338-1-2(1998)] and a post resonator method [See "Testing Method for Dielectric Properties of Fine Ceramic at Microwave Frequency," JIS (Japanese Industrial Standards): JIS R-1627(1996)].

The following Table 1 shows the sintering properties and the dielectric properties when the cation-substituted dielectric compositions mainly comprising $LaNbO_4$ were sintered for 2 hours at a temperature ranging from about 1,200° C.–1,400° C. in air.

TABLE 1

Sintering and Dielectric Properties of
$(A'_xA''_{1-x})^{3+}(B'_yB''_{1-y})^{5+}O_4$
$(0 \leq x \leq 1.0, 0 \leq y \leq 1.0)$

| Exs. | A' (x) La | A'' (1 − x) Nd | Al | Y | Bi | Sb | B' (y) Nb | B'' (1 − y) Ta | Sinter Temp. (° C.) | Sinter Density (g/□) | Qual. Coeffi. (Q × f) | Dielec. Const. ($\epsilon_r$) | Resonance Freq. Temp. Coeffi. ($T_f$, ×10⁻⁶/° C.) |
|---|---|---|---|---|---|---|---|---|---|---|---|---|---|
| 1 | 1 | — | — | — | — | — | 1 | — | 1200 | 5.70 | 49000 | 19.5 | 10 |
| 2 | — | 1 | — | — | — | — | 1 | — | 1250 | 6.09 | 33000 | 20.0 | −24 |
| 3 | — | — | 1 | — | — | — | 1 | — | 1400 | 4.23 | 35000 | 12.2 | −21 |
| 4 | — | — | — | 1 | — | — | 1 | — | 1200 | 5.41 | 45000 | 17.4 | −53 |
| 5 | 0.9 | 0.1 | — | — | — | — | 1 | — | 1250 | 5.76 | 45000 | 20.0 | −1 |
| 6 | 0.8 | 0.2 | — | — | — | — | 1 | — | 1250 | 5.82 | 43000 | 19.9 | −8 |
| 7 | 0.5 | 0.5 | — | — | — | — | 1 | — | 1250 | 5.95 | 41000 | 20.8 | −17 |
| 8 | 0.9 | — | 0.1 | — | — | — | 1 | — | 1250 | 5.68 | 50000 | 20.3 | 25 |
| 9 | 0.8 | — | 0.2 | — | — | — | 1 | — | 1250 | 5.54 | 35000 | 19.2 | 17 |
| 10 | 0.5 | — | 0.5 | — | — | — | 1 | — | 1250 | 5.09 | 43000 | 17.2 | 9 |
| 11 | 0.9 | — | — | 0.1 | — | — | 1 | — | 1250 | 5.79 | 54000 | 20.1 | 4 |
| 12 | 0.8 | — | — | 0.2 | — | — | 1 | — | 1250 | 5.76 | 52000 | 20.4 | 2 |
| 13 | 0.5 | — | — | 0.5 | — | — | 1 | — | 1250 | 5.67 | 51000 | 20.0 | −19 |
| 14 | 0.9 | — | — | — | 0.1 | — | 1 | — | 1250 | 5.89 | 30000 | 26.0 | 57 |
| 15 | 0.8 | — | — | — | 0.2 | — | 1 | — | 1250 | 5.97 | 15000 | 30.1 | 76 |
| 16 | 0.5 | — | — | — | 0.5 | — | 1 | — | 1250 | 6.24 | 10000 | 35.4 | −7 |
| 17 | 0.9 | — | — | — | — | 0.1 | 1 | — | 1250 | 5.81 | * | * | * |
| 18 | 0.8 | — | — | — | — | 0.2 | 1 | — | 1250 | 5.77 | * | * | * |
| 19 | 1 | — | — | — | — | — | 0.9 | 0.1 | 1250 | 5.94 | 30000 | 20.3 | −20 |
| 20 | 1 | — | — | — | — | — | 0.8 | 0.2 | 1250 | 6.14 | 50000 | 20.2 | −40 |
| 21 | 1 | — | — | — | — | — | 0.5 | 0.5 | 1300 | 6.59 | 26000 | 19.9 | −77 |

[Note: "—" indicates "0" and "*" indicates "be able to be measured."]

From the results of the above Table 1, it can be seen that the LaNbO$_4$-based composition in example 1 can be sintered at a relatively low temperature of about 1,200° C., exhibits a dielectric constant of about 20 with a quality factor of as large as 49,000, and has a temperature coefficient of resonant frequency of 10 ppm/° C., closing to zero. In addition, NdNbO$_4$, AlNbO$_4$, and YNbO$_4$ have dielectric constants of 12–20 and quality factors of 33,000–45,000, yet possess temperature coefficients of resonant frequencies corresponding to negative values that are in contrast with LaNbO$_4$.

As can be seen from the results of Table 1, when some cations in LaNbO$_4$-based compositions are substituted with other cations, the resulting dielectric compositions have changed dielectric properties. In particular, in Examples 5 through 13, replacement of La with Nd, Al or Y made it possible to control the temperature coefficient of resonant frequency at or near 0 while maintaining or increasing the quality factor. Further Examples 14 through 18 show that when a small amount of Sb or Bi is substituted for La, the dielectric constant is drastically increased. Also, in the case of substituting La with Bi, the temperature coefficient of resonant frequency increased to positive values. In Examples 19 through 21, where Nb is replaced with Ta, the temperature coefficient of resonant frequency is drastically reduced to negative values. Therefore, it can be found that the kind and amount of substituents may be selected so that the dielectric properties required for particular components are obtained.

EXAMPLES 22–36

Examples 22 through 36 show the effects resulting from the addition of sintering aid oxides on the dielectric properties and the sintering properties of LaNbO$_4$-based compositions.

The calcined LaNbO$_4$ powders, as shown in Examples X through Y were mixed with sintering aids and additives at desired weight ratios, as shown in Table 2, to conduct a milling process for 24 hours identical to this mixing process as described in Examples 1 through 21. The sintering aids were selected from B$_2$O$_3$, CuO, ZnO, Bi$_2$O$_3$ or mixtures thereof and added at an amount of about 1 to about 7 parts by weight with or without the additives selected from V$_2$O$_5$, SnO$_2$, MgO, NiO, Sb$_2$O$_3$, LiF, Ag$_2$O or mixtures thereof. The dielectric compositions were prepared in the same manner as described in Examples 1 through 21.

In Table 2, there are provided sintering properties and dielectric properties when the dielectric composition comprising mainly LaNbO$_4$ is mixed with a sintering aid, and optionally when the additive was sintered at a temperature ranging from about 875° C.–to about 1,150° C. in air.

TABLE 2

Low Temperature Sintering and Dielectric Properties of LaNbO$_4$ Composition

| Exs. | CuO | B$_2$O$_3$ | ZnO | Bi$_2$O$_3$ | V$_2$O$_5$ | LiF | NiO | MgO | Sb$_2$O$_3$ | SnO$_2$ | Ag$_2$O | Sinter Temp. (° C.) | Sinter Density (g/□) | Qual. Coeffi. (Q × f) | Dielec. Const. ($\epsilon_r$) | Resonance Freq. Temp. Coeffi. (T$_f$, ×10$^{-6}$/° C.) |
|---|---|---|---|---|---|---|---|---|---|---|---|---|---|---|---|---|
| 1  | —   | —   | — | — | —   | — | — | — | — | — | — | 1200 | 5.70 | 49000 | 19.5 | 10  |
| 22 | 1   | —   | — | — | —   | — | — | — | — | — | — | 950  | 5.73 | 50000 | 19.7 | 15  |
| 23 | 3   | —   | — | — | —   | — | — | — | — | — | — | 950  | 5.76 | 48000 | 20.0 | 14  |
| 24 | 5   | —   | — | — | —   | — | — | — | — | — | — | 950  | 5.78 | 50000 | 20.1 | 18  |
| 25 | —   | 0.5 | — | — | —   | — | — | — | — | — | — | 1100 | 5.75 | 55000 | 19.0 | 6   |
| 26 | —   | —   | — | 3 | —   | — | — | — | — | — | — | 900  | 5.80 | 41000 | 20.6 | −31 |
| 27 | —   | —   | — | — | 0.3 | — | — | — | — | — | — | 1150 | 5.61 | 34000 | 24.6 | 120 |
| 28 | —   | —   | — | — | —   | 3 | — | — | — | — | — | 1000 | 5.64 | 42000 | 18.8 | −10 |
| 29 | 1   | 0.3 | — | — | —   | — | — | — | — | — | — | 875  | 5.71 | 60000 | 19.4 | 4   |
| 30 | —   | 0.3 | 1 | — | —   | — | — | — | — | — | — | 950  | 5.60 | 51000 | 19.1 | 15  |
| 31 | —   | 0.3 | 3 | — | —   | — | — | — | — | — | — | 925  | 5.70 | 21000 | 19.9 | 7   |
| 32 | —   | 0.3 | — | — | —   | — | 3 | — | — | — | — | 1150 | 5.66 | 44000 | 18.8 | −8  |
| 33 | —   | 0.3 | — | — | —   | — | — | 3 | — | — | — | 1100 | 5.71 | 58000 | 19.6 | 19  |
| 34 | —   | 0.3 | — | — | —   | — | — | — | 3 | — | — | 1150 | 5.59 | 19000 | 19.1 | 72  |
| 35 | —   | 0.3 | — | — | —   | — | — | — | — | 3 | — | 1100 | 5.78 | 11000 | 21.4 | 0   |
| 36 | —   | 0.3 | — | — | —   | — | — | — | — | — | 3 | 1050 | 5.64 | 22000 | 20.0 | 7   |

From the results of Table 2, it may be observed that the sintering temperature is drastically decreased when a sintering aid or additive is added to the LaNbO$_4$-based dielectric composition. In Example 1, the LaNbO$_4$-based dielectric composition prepared without a sintering aid, was capable of being sintered at 1,200° C., thereby resulting in a quality factor of 49,000 and a dielectric constant of 19.5. In particular, this composition has the advantage that the resulting temperature coefficient of resonant frequency is a low value of about 10.

Meanwhile, it can be observed that the sintering aid oxides selected from B$_2$O$_3$, ZnO, CuO, and Bi$_2$O$_3$ are useful in controlling the sintering temperature of the LaNbO$_4$-based dielectric compositions. These sintering aids improve the sintering properties of the compositions whereby they enhance the quality factors and do not negatively alter the values of the temperature coefficient of resonant frequency. Further, the oxides selected from V$_2$O$_5$, SnO$_2$, MgO, NiO, Sb$_2$O$_3$, LiF or Ag$_2$O are useful as additives, and are responsible for decreasing the sintering temperature.

As shown in Examples 22 through 36 of Table 2, when the sintering aid and the additive are added to the LaNbO$_4$ based composition, the composition is capable of being sintered at 1,000° C. or lower so that the composition may be baked with low melting point electrodes including silver, copper, or silver/palladium, in order to manufacture laminated elements.

A composition possessing a dielectric constant of about 20 with a quality factor of 40,000 or higher may be employed in the fabrication of microwave elements of GHz bands. In this regard, when manufacturing chip type parts such as chip LC filters, chip duplexers, planar antenna, planar filters, MCM and circuit substrates, the miniaturization and low dielectric loss of such parts can be realized because the composition of the present invention is characterized by a high dielectric constant and a small dielectric loss. Additionally, a dielectric composition with a low temperature coefficient of resonant frequency can be used as temperature-stabilized capacitors (NPO MLCC).

The $LaNbO_4$-based dielectric composition of the present invention, prepared by adding a sintering aid and/or additive, can also be applied to microwave lamination parts for high frequency bands based on the ability of the composition to under go baking with low-melting point electrodes.

Previous low temperature sintering experiments have shown that $LaNbO_4$-based dielectric compositions exhibit the best sintering and dielectric properties when the composition incorporates CuO and $B_2O_3$ in a ratio of 1:0.3 parts by weight.

EXAMPLES 37–55

Examples 37 through 55 demonstrate the changes of the dielectric properties and sintering properties of the $LaNbO_4$ dielectric composition when 1 part by weight of CuO and 0.3 parts by weight of $B_2O_3$ are added to the composition. The results establishing this finding are shown in Table 3.

trolled by substituting Nd, al and Y for La with the addition of CuO and $B_2O_3$.

When Bi and Ta are substituted for La and Nb, respectively, the temperature coefficient is drastically altered to positive and negative values.

APPLICATION EXAMPLE

A sintering aid and additive may be added to a composition according to the formula $(A'_xA''_{1-x})^{3+}(B'_yB''_{1-y})^{5+}O_4$ where $(0 \leq x \leq 1.0,\ 0 \leq y \leq 1.0)$ such that multilayered components, such as a dielectric filter for PCS, can be manufactured.

In Example 29, starting materials were weighed and then mixed with an organic solvent mixture of ethanol, butanol, isopropanol and toluene, at a weight ratio of 1:1. To the resulting mixture was added 10 parts by weight of polyvinyl butyral and 5 parts by weight of a plasticizer based on the dielectric powder. The resultant mixture was subsequently mixed for 24 hours to obtain slurry for tape casting.

The prepared slurry was deaerated and molded into a thin dielectric tape with a thickness of 10–150 μm by use of a tape caster, followed by the printing of an inner electrode on the tape by use of a silver paste. The inner electrode-printed tape was stacked one after another and layered under pressure at temperature ranging from about 40 to about 70° C. The layered structure was cut to a predetermined size, passed through a process of binder burn-out, and then sintered at about 900° C. for 2 hours.

TABLE 3

Low Temperature Sintering and Dielectric of 1 part by weight of CuO and 0.3 parts by weight of $B_2O_3$-added $(A'_xA''_{1-x})^{3+}(B'_yB''_{1-y})^{5+}O_4$ $(0 \leq x \leq 1.0, 0 \leq y \leq 1.0)$

| | A' (x) | | A" (1 − x) | | | | B' (y) | B" (1 − y) | Sinter Temp. (° C.) | Sinter Density (g/□) | Qual. Coeffi. (Q × f) | Dielec. Const. ($\epsilon_r$) | Resonance Freq. Temp. Coeffi. ($T_f$, ×10$^{-6}$/° C.) |
|---|---|---|---|---|---|---|---|---|---|---|---|---|---|
| Exs. | La | Nd | Al | Y | Bi | Sb | Nb | Ta | | | | | |
| 37 | 0 | 1 | — | — | — | — | 1 | — | 875 | 6.15 | 46000 | 19.1 | −37 |
| 38 | 0 | — | 1 | — | — | — | 1 | — | 1000 | 4.22 | 49000 | 12.4 | −52 |
| 39 | 0.9 | 0.1 | — | — | — | — | 1 | — | 875 | 5.78 | 33000 | 20.0 | 10 |
| 40 | 0.8 | 0.2 | — | — | — | — | 1 | — | 875 | 5.87 | 30000 | 19.7 | −2 |
| 41 | 0.5 | 0.5 | — | — | — | — | 1 | — | 900 | 5.95 | 29000 | 19.5 | −23 |
| 42 | 0.9 | — | 0.1 | — | — | — | 1 | — | 925 | 5.60 | 42000 | 19.3 | 15 |
| 43 | 0.8 | — | 0.2 | — | — | — | 1 | — | 925 | 5.46 | 40000 | 18.4 | 11 |
| 44 | 0.5 | — | 0.5 | — | — | — | 1 | — | 950 | 4.85 | 48000 | 15.3 | −4 |
| 45 | 0.9 | — | — | 0.1 | — | — | 1 | — | 925 | 5.73 | 58000 | 19.2 | 8 |
| 46 | 0.8 | — | — | 0.2 | — | — | 1 | — | 875 | 5.68 | 54000 | 19.1 | −4 |
| 47 | 0.5 | — | — | 0.5 | — | — | 1 | — | 1000 | 5.47 | 50000 | 18.5 | −10 |
| 48 | 0.9 | — | — | — | 0.1 | — | 1 | — | 875 | 5.83 | 47000 | 24.0 | 61 |
| 49 | 0.8 | — | — | — | 0.2 | — | 1 | — | 875 | 5.96 | 39000 | 28.5 | 88 |
| 50 | 0.5 | — | — | — | 0.5 | — | 1 | — | 875 | 6.56 | 11000 | 43.0 | 32 |
| 51 | 0.9 | — | — | — | — | 0.1 | 1 | — | 900 | 5.79 | * | * | * |
| 52 | 0.8 | — | — | — | — | 0.2 | 1 | — | 925 | 5.67 | * | * | * |
| 53 | 1 | — | — | — | — | — | 0.9 | 0.1 | 875 | 5.85 | 47000 | 20.4 | −23 |
| 54 | 1 | — | — | — | — | — | 0.8 | 0.2 | 875 | 5.96 | 55000 | 19.7 | −35 |
| 55 | 1 | — | — | — | — | — | 0.5 | 0.5 | 900 | 6.73 | 10000 | 19.2 | −59 |

[Note: "—" indicates "0" and "*" indicates "be able to be measured."]

As best seen in the above Table 3, the added oxides exert great influence on the sintering properties and the dielectric properties of the cation-substituted $LaNbO_4$-based composition. The low temperature sintered composition in which Nd, Al and Y are substituted for La with the addition of CuO and $B_2O_3$, is characterized by a quality factor of 30,000 or higher and a dielectric constant of about 15 to about 20. In all substituted compositions, the temperature coefficient of resonant frequency is approximately zero and can be con- The resulting multilayered components were measured for their scattering parameters ($S_{11}$, $S_{21}$) at different frequency bands with the aid of a network analyzer HP8720C supplied by Hewlett-Packard Co. (Palo Alto, Calif.). The results demonstrate that the components have an insertion loss of 1 dB or less indicating that they are superior to conventional $CaO—ZrO_2$, or $(Mg, Ca)TiO_3$ products.

As described above in detail, the present dielectric composition can be sintered at about 1000° C. or lower and thus simultaneously baked with low-melting point electrodes, such as silver (Ag). The resulting ceramic dielectric composition can be used as a dielectric for lamination capacitors (MLCC), and is suitable for use in manufacturing mobile communication components, such as PCS, based on the composition possessing desirable physical properties including a low dielectric loss and low dielectric constant temperature coefficient.

Further, cation-substituted $A'_xA''_{1-x}B'_yB''_{1-y}O_4$ based dielectric compositions possess low dielectric loss, low temperature sintering properties, and very low resonance frequency temperature changes. These desirable properties thus enable cation-substituted compositions to be applied to temperature stabilized parts, for example, temperature stabilized capacitors (NPO MLCC), microwave oscillators, substrates, filters, planar antennas and the like. Also, the range of compositions possessing advantageous dielectric properties is extensive and the dielectric properties are largely unaffected by changes in the sintering temperature resulting in stable and uniform manufacturing process.

Numerous characteristics and advantages have been set forth in the foregoing description, together with details of structure and function. The novel features are pointed out in the appended claims. The disclosure, however, is illustrative only, and changes may be made in detail, especially in matters of shape, size, number, and arrangement of materials, within the principle of the invention, to the full extent indicated by the broad general meaning of the terms in which the appended claims are expressed.

What is claimed is:

1. A dielectric ceramic composition comprising, (A) at least one oxide selected from the group consisting of $La_2O_3$, $Nd_2O_3$, $Al_2O_3$ and $Y_2O_3$, and (B) at least one oxide selected from the group consisting of $Nb_2O_5$ and $Ta_2O_5$, at a molar ratio of 1:1, wherein said composition is represented by the general formula:

$$A'_xA''_{1-x}B'_yB''_{1-y}O_4$$

where,

A' and A" represent elements selected from the group consisting of La, Nd, Y and Al;

B' and B" represent elements selected from the group consisting of Nb and Ta and;

x and y represent mole fractions, in the range of $0 \leq x \leq 1.0$, and $0 \leq y \leq 1.0$, respectively and x and y are not simultaneously equal to one.

2. The dielectric ceramic composition according to claim 1, further comprising about 0.01 to about 7 parts by weight of at least one sintering aid selected from the group consisting of $B_2O_3$, CuO, ZnO and $Bi_2O_3$, based on 100 parts by weight of said composition represented by the formula $A'_xA''_{1-x}B'_yB''_{1-y}O_4$.

3. The dielectric ceramic composition according to claim 2, wherein said sintering aid is selected from the group consisting of $B_2O_3$ and CuO.

4. The dielectric ceramic composition according to claim 1, further comprising about 0.01 to about 7 parts by weight of at least one additive selected from the group consisting of $V_2O_5$, $SnO_2$, MgO, NiO, $Sb_2O_3$, LiF and $Ag_2O$, based on 100 parts by weight of said composition represented by the formula $A'_xA''_{1-x}B'_yB''_{1-y}O_4$.

5. The dielectric ceramic composition according to claim 1, wherein said A' is La; said B' is Nb; and said.

6. The dielectric ceramic composition according to claim 5, further comprising from about 0.01 to about 7 parts by weight of at least one sintering aid selected from the group consisting of $B_2O_3$, CuO, ZnO and $Bi_2O_3$, based on 100 parts by weight of said composition represented by the formula $A'_xA''_{1-x}B'_yB''_{1-y}O_4$.

7. The dielectric ceramic composition according to claim 5, further comprising from about 0.01 to about 7 parts by weight of at least one additive selected from the group consisting of $V_2O_5$, $SnO_2$, MgO, NiO, $Sb_2O_3$, LiF and $Ag_2O$, based on 100 parts by weight of said composition represented by the formula $A'_xA''_{1-x}B'_yB''_{1-y}O_4$.

8. The dielectric ceramic composition according to claim 1, wherein said A' is La; and said A" is selected from the group consisting of Nd, Al and Y.

9. The dielectric ceramic composition according to claim 1, wherein said B' is Nb; and said B" is Ta.

10. The dielectric ceramic composition according to claim 1, wherein said A' is La; said A" is selected from the group consisting of Nd, Al and Y; said B' is Nb; and said B" is Ta.

11. The dielectric ceramic composition according to claim 10, further comprising from about 0.01 to about 7 parts by weight of at least one sintering aid selected from the group consisting of $B_2O_3$, CuO, ZnO and $Bi_2O_3$, based on 100 parts by weight of said composition represented by the formula $A'_xA''_{1-x}B'_yB''_{1-y}O_4$.

12. The dielectric ceramic composition according to claim 10, further comprising from about 0.01 to about 7 parts by weight of at least one additive selected from the group consisting of $V_2O_5$, $SnO_2$, MgO, NiO, $Sb_2O_3$, LiF and $Ag_2O$, based on 100 parts by weight of the main composition represented by the formula $A'_xA''_{1-x}B'_yB''_{1-y}O_4$.

13. A method for manufacturing multilayered components, comprising the steps of:

mixing a composition represented by the formula $A'_xA''_{1-x}B'_yB''_{1-y}O_4$ with either one of a sintering aid and an additive, to form a slurry, said A' and said A" being elements selected from the group consisting of La, Nd, Y and Al, said said B' and B" being elements selected from the group consisting of Nb and Ta, and said x and said y being mole fractions, in the range of $0 \leq x \leq 1.0$, and $0 \leq y \leq 1.0$, respectively;

deaerating said slurry, followed by molding said slurry into a tape form;

printing an inner electrode on said molded tape form by use of a low melting point electrode paste with a melting point of about 1,000° C. or lower;

laminating said inner electrode-printed tape to at least two layers; and sintering said laminated tape in a sintering furnace at about 1000° C. or lower.

14. The method as defined in claim 13, wherein said at least one sintering aid is selected from the group consisting of $B_2O_3$, CuO, ZnO and $Bi_2O_3$, wherein said at least one sintering aid is added in an amount from about 0.01 to about 7 parts by weight, based on 100 parts by weight of said composition represented by the formula $A'_xA''_{1-x}B'_yB''_{1-y}O_4$.

15. The method according to claim 13, wherein said at least one additive is selected from the group consisting of $V_2O_5$, $SnO_2$, MgO, NiO, $Sb_2O_3$, LiF and $Ag_2O$, wherein said at least one additive is added in an amount from about 0.01 to about 7 parts by weight, based on 100 parts by weight of said composition represented by $A'_xA''_{1-x}B'_yB''_{1-y}O_4$.

16. The method according in claim 13, wherein said A' is La; said x is 1; said B' is Nb; and said y is 1.

17. The method according to claim 13, wherein said A' is La; said A" is selected from the group consisting of Nd, Al and Y; said B' is Nb; and said B" is Ta.

* * * * *